United States Patent [19]

Tew

[11] Patent Number: 4,580,051

[45] Date of Patent: Apr. 1, 1986

[54] INFRARED IMAGING SYSTEMS WITH PSEUDO AC COUPLING CIRCUIT

[75] Inventor: Claude E. Tew, Dallas, Tex.

[73] Assignee: Texas Instruments Incorporated, Dallas, Tex.

[21] Appl. No.: 668,126

[22] Filed: Nov. 5, 1984

[51] Int. Cl.$^4$ ................... H01L 31/02; H01L 25/00
[52] U.S. Cl. ................... 250/338; 328/127; 250/332
[58] Field of Search ............ 250/332, 370 G, 338 SE, 250/330, 349; 328/127; 307/228 (U.S. only)

[56] References Cited

U.S. PATENT DOCUMENTS 3,238,383   3/1966   Falk .................. 307/240
3,742,238   6/1973   Hoffman, II .......... 250/332

OTHER PUBLICATIONS

D. J. Carlson, A. D. Markum, G. L. Payton and R. S. Spriggs, "Development of a Staring Mosaic Module", *Proceedings of the Society of Photooptical Instrument Engineers Conference: Modern Utilization of Infrared Technology V*, vol. 197 (1979) pp. 2-8.

*Primary Examiner*—Alfred E. Smith
*Assistant Examiner*—Constantine Hannaher
*Attorney, Agent, or Firm*—Alva H. Bandy; Leo N. Heiting; Melvin Sharp

[57] ABSTRACT

A thermal energy imaging system includes an optical system for focusing thermal energy emanating from a scene on an array of bulk semiconductor photodetectors. The detector array outputs electrical signals representative of the impinging thermal energy, a video electronic circuit and a pseudo ac coupling circuit interconnecting the detector array and video electronic circuit for reducing the required dynamic range of the video electronic circuit. The pseudo ac coupling circuit includes first and second electrical paths to an sychronous clamp. The first path includes a switch to the synchronous clamp; the second clamp includes first and second integrator circuits and a switch; the switch is connected to the synchronous clamp. The synchronous clamp includes an amplifier, capacitor and grounded switch. When the switch of the first electrical path is open and the switch of the second electrical path and synchronous clamp are closed, line picture element signals are voltage averaged and stored on the capacitor of the synchronous clamp. When the switch of the first electrical path is closed and the switches of the second electrical path and synchronous clamp are opened, the stored average voltage is combined with the line picture element signals to the video electronic circuitry for noise reduction. The first and second integrators comprise switched capacitors with the first integrator voltage averaging preselected portions of a line of picture element signals and the second integrator voltage averaging the average voltage of the portions of picture elements to provide a voltage average for a line of picture elements.

5 Claims, 6 Drawing Figures

INFRARED IMAGING SYSTEMS WITH PSEUDO AC COUPLING CIRCUIT

This invention relates to thermal energy imaging systems and more particularly to a thermal energy system having a "pseudo" ac coupler.

In the past thermal energy imaging systems such as those described in U.S. Pat. No. 3,742,238 issued June 26, 1973 to Richard G. Hoffman, assignor to Texas Instruments Incorporated for a "TWO AXES ANGULARLY INDEXING SCANNING SYSTEM" includes a lens assembly, a scanning assembly, a detector array and display system.

Incoming infrared energy from a scene enter and passes through the lens assembly, impinges on the scanner assembly which scans the energy across the detector array. The detector array converts the thermal energy of the scene to electrical signals representative of the thermal energy emanating from the scene. The output from the detector array is fed to video electronic circuitry whose output is fed to a light source of the display system.

The electronic circuitry has included individual capacitors for continuous time ac coupling of the detectors' buffer output of the array of detectors to amplifiers of the electronic circuitry or an ac couple dc restore synchronous clamp is used to effectively level shift video.

For continuous time ac coupling, large RC (resistor/capacitor) time constants are required; however, the time constant has to be low enough for the coupling network to adaptively level shift video to any abrupt quiescent operating point change. This response is chosen to be about ½ to about 1 Hertz in most thermal energy systems. This provides a reasonable tradeoff between "droop" and adaptive offset correction. The capacitors for integrated circuits do not exceed about 20 pico farads. Thus, a resistance of about 5×10 exp 10 Ohms is required. Nevertheless, reasonable resistance for integrated circuits cover a range of about 10 Ohms to 10 exp 6 Ohms; MOS (metal oxide semiconductors) integrated circuits have resistances above about 10 exp 15 Ohms. Thus, the required resistance is about four orders of magnitude above or below integratable values.

A synchronous clamp can be used to ac couple/dc restore the signal. This clamp does not have a "droop" problem, but the incoming signal cannot be continuous. That is, periodically, a reference signal has to be present to set the clamp. For thernal energy systems, the reference signal is inserted optically at the front end, and reimaging optical systems and a well controlled thermal source that tracks the background quiescent radiation are required; these are costly and complicate the system structure.

Accordingly, it is an object of this invention to provide a thermal energy imaging system having electronic circuitry suitable for integrated (monolithic) circuits.

Another object of the invention is to provide a thermal energy imaging system which is simple in construction and cost effective.

A further object of the invention is to provide a pseudo ac coupling device that will accomplish a function equivalent to an ac coupling function.

Briefly stated the thermal energy imaging system utilizes a "pseudo-ac" coupling circuit which will accomplish a coupling function which is equivalent to the ac coupling (RC) circuit between the detector array and the video electronic circuitry. The pseudo-ac coupling circuit is integratable into a monolithic (integrated) circuit.

Other objects and features of the invention will become more readily apparent from the following detailed description when read in conjunction with the accompanying drawings in which.

Figure 1:
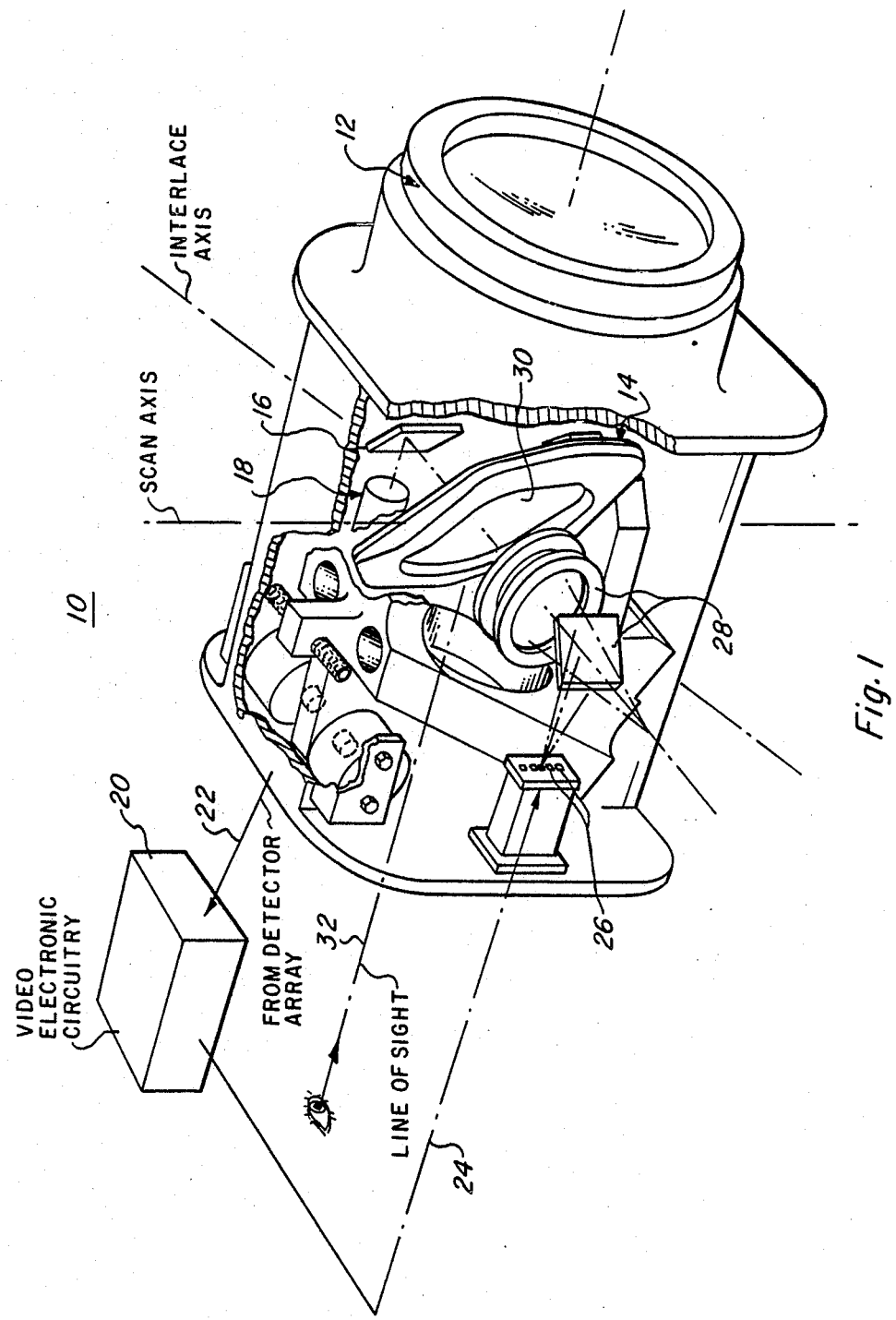
FIG. 1 is an isometric view of a thermal energy imaging system.

Referring now to FIG. 1, the thermal energy imaging system 10 comprises a lens assembly 12 for receiving thermal energy from a source thereof and passing it along the optical path to a scanner 14. Scanner 14 includes a mirror for reflecting the scanned energy to reflecting mirror 16 which reflects the scanned energy onto the detector array 18. Video electronic circuitry 20 is connected by lead 22 to the detector array. The detector arrray is an array of photoconductors such as, for example, HgCdTe detectors.

The video electronic circuitry 20 includes the ac coupling circuit hereinafter described for ac coupling offset terms and removing dark currents or bias levels therefrom to provide signals within the dynamic range of the system. The video electronic circuitry is connected by lead 24 to an array of light emitting diodes 26. The array of light emitting diodes recevies the electrical signals indicative of the thermal energy emanating from the scene and outputs visible representations thereof.

The visible light is reflected by reflecting mirror 28 onto a reflecting mirror 30 attached to the backside of the scanner 14. The scanning motion of the mirror 30 removes phase shift imparted to the image by the video electonic circuitry 20. The reflected image of mirror 30 passes down the line-of-sight path 32 for viewing.

Figure 2:
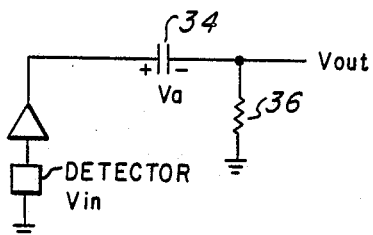
FIG. 2 is a schematic circuit of an RC coupling circuit.
Figure 3:
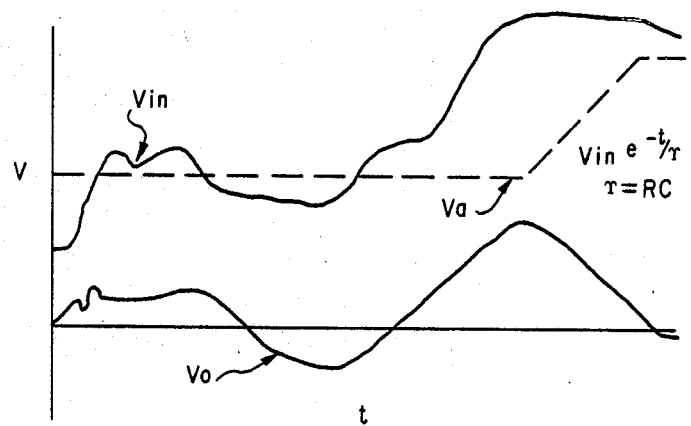
FIG. 3 is chart showing the voltage/time characteristics of a continuous time ac coupling circuit.

A conventional ac coupling circuit (FIG. 2) includes a capacitor 34, and resistor 36. Continuous time ac coupling is now described using the circuit of FIG. 2 and the VT characteristic chart of FIG. 3. Continuous time ac coupling constitutes a subtraction of an average voltage (Va) from the votage of the video signal (Vin) to provide Vo. Va is an exponentially weighted average of previously obtained information and is represented as follows:

$$V_{out} = V_{in}\, e^{-t/tau}$$

where tau=RC.

The RC time constant of the circuit determines the rate at which Va can seek a new level. The RC time constant in most prior art systems has to be long in order to avoid "droop" in the video signals. Nevertheless, Va need only be the "average" of a previous frame of video in order to accomplish ac coupling. When Va is computed and then stored, for example, in a synchronous clamp, equivalent ac coupling is accomplished. As the clamp is synchronous, "droop" is not a problem.

The phrase "pseudo-ac coupling" was coined to refer to this voltage averaging technique.

Figure 4:
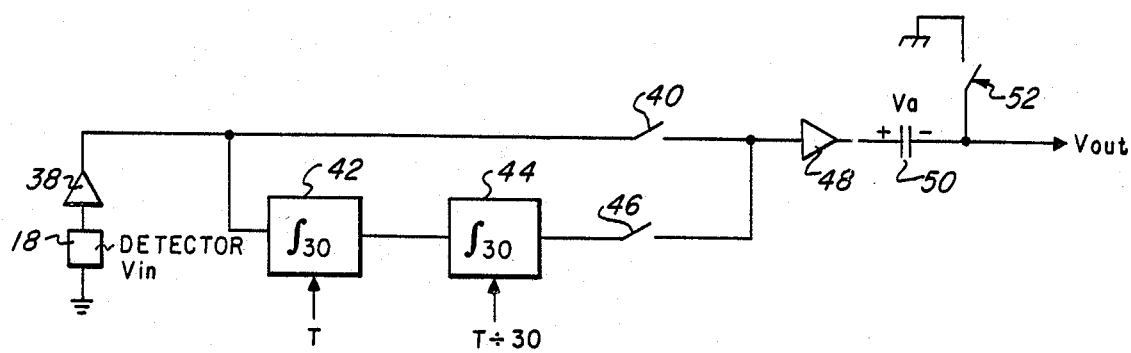
FIG. 4 is a schematic diagram, partly in block form, of the pseudo-ac coupling circuit of the present invention.

Referring now to FIG. 4, the average voltage (Va) circuit comprises two electrical path beginning at buffer 38 which buffers the outputs of detector array 18. Buffer 38 is connected to the junction of switch 40 of the first path, and a first integrator circuit 42 of the second path. Integrator circuit 42 is connected to a second integrator circuit 44 and second integrator 44 is connected to switch 46. An amplifier 48 is connected to the junction of switches 40 and 46 of the first and second electrical paths. Amplifier 48 has its output terminal connected to a capacitor 50. Capacitor 50 is connected to equivalent signal ground through a switch 52. Integrator circuits 44 and 46 comprise a plurality of switched capacitors 54 and 56 and 60 and 62 and amplifiers 58 and 64. The switched capacitors comprises metal oxide semiconductor (MOS) switches 66, 68 70 and 72 and capacitors 74, 76, 78 and 80.

Each integrator circuit includes two switched capacitors. The switches are clocked on and off as shown in the timing waveform (FIGS. 6a–6d).

For purposes of describing the operation of the integrator circuits 42 and 44 and not by way of limitation, it is assumed that the number of pixel elements in each line of video is 900; this is a reasonable value for the number of picture elements in a line of video. Simple recursive video filtering is computed in two steps. The first step in integrator circuit 42 and the second step in integrator 44. In the first step, integrator 42 integrates the values of the 900 pixels in 30 pixel segments to provide an approximate average value for each 30 pixel segment; in the second step, the integrator 44 integrates 30 average values of the 30 pixel segments. The net output in the exponentially weighted average of the 900 pixels. The amplifiers 58 and 64 restore the filtered outputs of the integrators 42 and 44, respectively, to working levels.

The exponential integration is performed in the analog domain. Thus, high speed analog to digital conversion is eliminated. The continuous voltage and continuous time signal is sampled and held on capacitors 74 and 78 by switches 66 and 70. When switches 68 and 72 are closed, the charges stored on capacitors 74 and 76, and 78 and 80 are shared. The resulting voltage after a plurality of cycles is:

$$X_o = (1-\text{alpha})(\text{alpha}^0 X_n + \text{alpha}^1 X_{n-1} + \text{alpha}^2 X_{n-2} + ...)$$

where $X_o$=output, and $X_n$=corresponding input, and alpha=$C_{76}/C_{74}+C_{76}$ or =$C_{80}/C_{78}+C_{80}$ In the example used $C_{76}$ or $C_{80}$=29/2 $C_{74}$ $C_{78}$ During the scanner's dead time, which may be, for example, when the scanner is off for reversing the direction of rotation of the scanning mirror, switches 46 and 52 (FIG. 4) are closed and switch 40 opened to store the average line scan voltage on capacitor 50. Then when switches 46 and 52 are open and switch 40 closed during on time of the scanner, normal video passes through capacitor 50 to provide the output voltage Vo.

The four phase clocking of the filter is shown in FIGS. 6a–6d. T represents a pixel time associated with the thermal energy imaging system and the switches 66, 68, 70 and 72 are open during highs. As shown in FIG. 6 switch 66 of integrator 44 is closed by the first phase clock pulse for a time T and thereafter opened and closed for times T to integrate the pixel values for a preselected number of pixels—30 in the example. During time T of the first pixel and while switch 66 is closed, switch 68 is closed by the second phase clock pulse (FIG. 6b) and thereafter opened and closed for times T to integrate a number of pixels corresponding to those for switch 66. When switch 68 closes the voltage on capacitors 74 and 76 are shared (averaged and phase corrected) and restored to a working level by amplifier 58.

Figure 5:
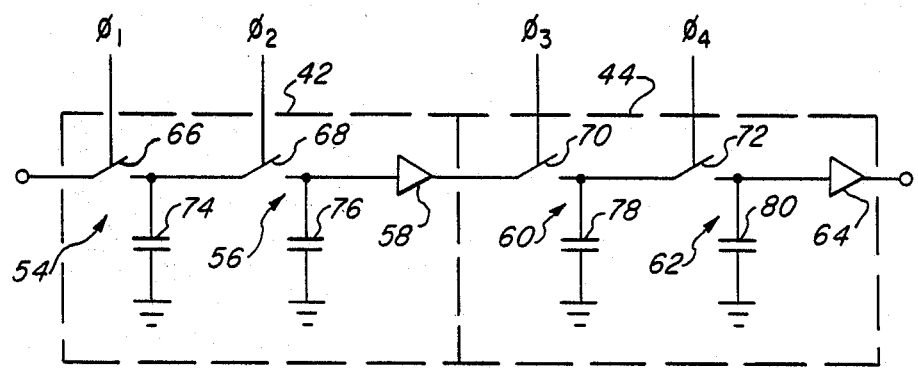
FIG. 5 is a schematic diagram of the ac voltage integrators shown in block form in FIG. 4.
Figure 6:
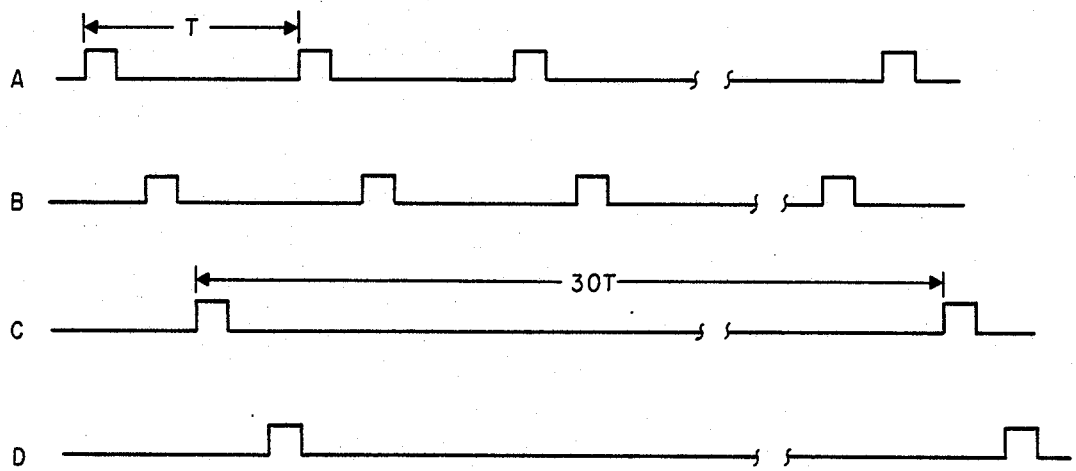
FIGS. 6a–6d are timing diagrams showing the timing function for the integrators of FIG. 5.

Also during the time T of the first pixel, while switch 68 is closed, switch 70 is closed by the third phase clock pulse at preselected intervals—in our example 30T—to store the, integrated, amplified outputs (30 pixel outputs) on capacitor 78. Finally, when switch 72 is closed by the fourth phase clock during the first pixel time T and subsequent preselected intervals (30T), the voltages of capacitors 78 and 80 are shared to provide an average voltage for a single line of video pixels (900 in our example) is restored to a working level in amplifier 64. As previously stated, during scanning deadtime switches 46 and 52 (FIG. 4) are closed to connect the amplifier 64 (FIG. 5) to amplifier 48 (FIG. 4) for further amplification of the average output voltage. The amplifier 48 is connected to capacitor 50 where the average output voltage is stored for subtraction from the detector output voltage when switches 46 and 52 are opened and switch 40 is closed.

Those persons skilled in the art desiring more information about MOS Switched-Capacitor Filters are referred to an article entitled "MOS Switched-Capacitor Filters" by Robert W. Brodersen, Paul R. Gray and David A. Hodges, Proceedings Of The IEEE, Vol. 67, No. 1, January 1979, and about their use in charge injection imaging systems are referred to U.S. patent application Ser. No. 528,304 (TI-8713), filed Aug. 31, 1983, for "Analog Fading Memory", inventors Claude E. Tew, assignor to Texas Instruments Incorporated.

Although only a single embodiment of the invention has been described, it will be apparent to a person skilled in the art that various modifications to the details of construction shown and described may be made without departing from the scope of this invention.

What is claimed is:

1. A thermal energy imaging system comprising:
   (a) an optical system for focusing thermal energy emanating from a scene onto a detector array;
   (b) a semicondutor photodetector array for converting the thermal energy to electrical signals representative of the thermal image of the scene;
   (c) an electronic video signal processing circuit; and
   (d) a pseudo ac coupling circuit connected to the output of the photodetector array for equivalently ac coupling the output of the photodetector array to the electronic video signal producing circuit for reducing the dynamic range required of the electronic video signal processing circuit.

2. A thermal energy imaging system according to claim 1 wherein the pseudo ac coupling circuits comprises first and second electrical paths to a synchronous clamp, said first path including a switch connected to the synchronous clamp, said second path including first and second integrators connected together for voltage averaging a line of picture elements, and a switch connected to the synchronous clamp for selectively connecting the average voltage output to the synchronous clamp, and said synchronous clamp including an amplifier operatively connected to the switches of the first and second electrical paths, a capacitor connected to the amplifier and a grounded switch connected to the capacitor, whereby when the switches of the second electrical path and synchronous clamp are closed and the switch of the first electrical path opened the average voltage of a pixel line are stored on the capacitor of the synchronous clamp and when the switches of the second electrical path and synchronous clamp are opened and the switch of the first electrical path closed the average voltage of the capacitor is combined with the output of the detector array to remove fixed pattern noise and offsets therefrom and reduce the required dynamic range of the video electronic processing circuitry.

3. A thermal energy imaging system according to claim 2 wherein the first and second voltage averaging integrators comprise a plurality of switching capacitors for averaging the voltage of a line of the detector array electrical output for picture elements.

4. A thermal energy imaging system according to claim 3 wherein the plurality of switching capacitors for the first integrator comprises first and second switching capacitors operatively connected together for integrating and averaging a preselected number of picture element voltages.

5. A thermal energy imaging system according to claim 4 wherein the plurality of switching capacitors for the second integrator includes first and second switching capacitors, the first switching capacitor connected to the second switching capacitor of the first integrator for receiving the integrated average voltage of each preselected number of picture element voltages, said third and fourth switching capacitors operatively connected to produce an integrated average voltage for the line of picture elements.

* * * * *